May 19, 1953 J. B. THOMAS 2,639,051
PALLET STACK UNLOADER
Filed April 16, 1948 6 Sheets-Sheet 1
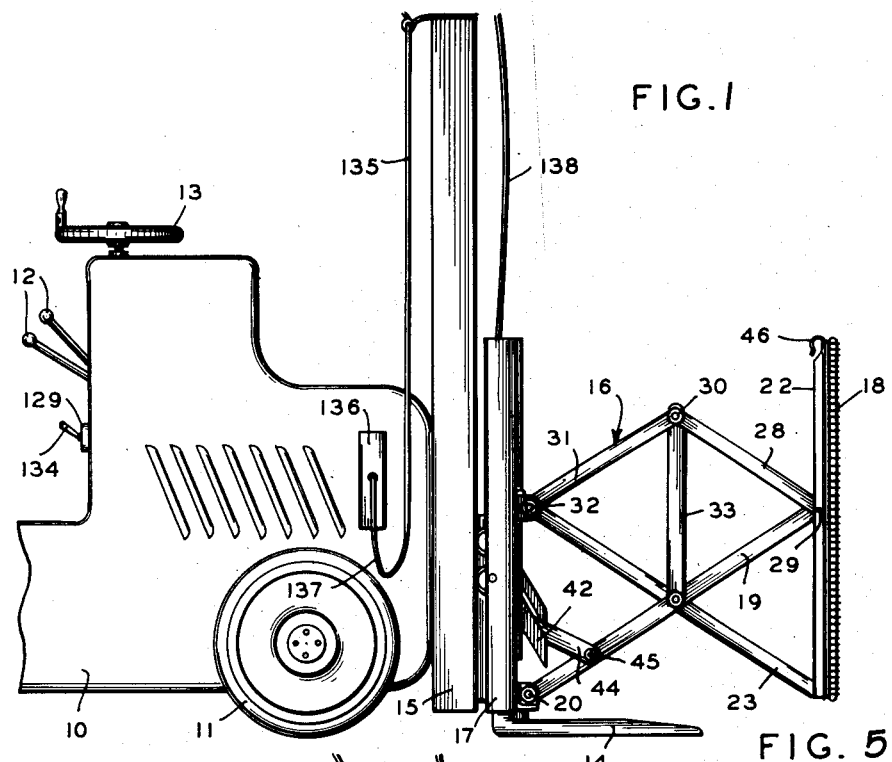
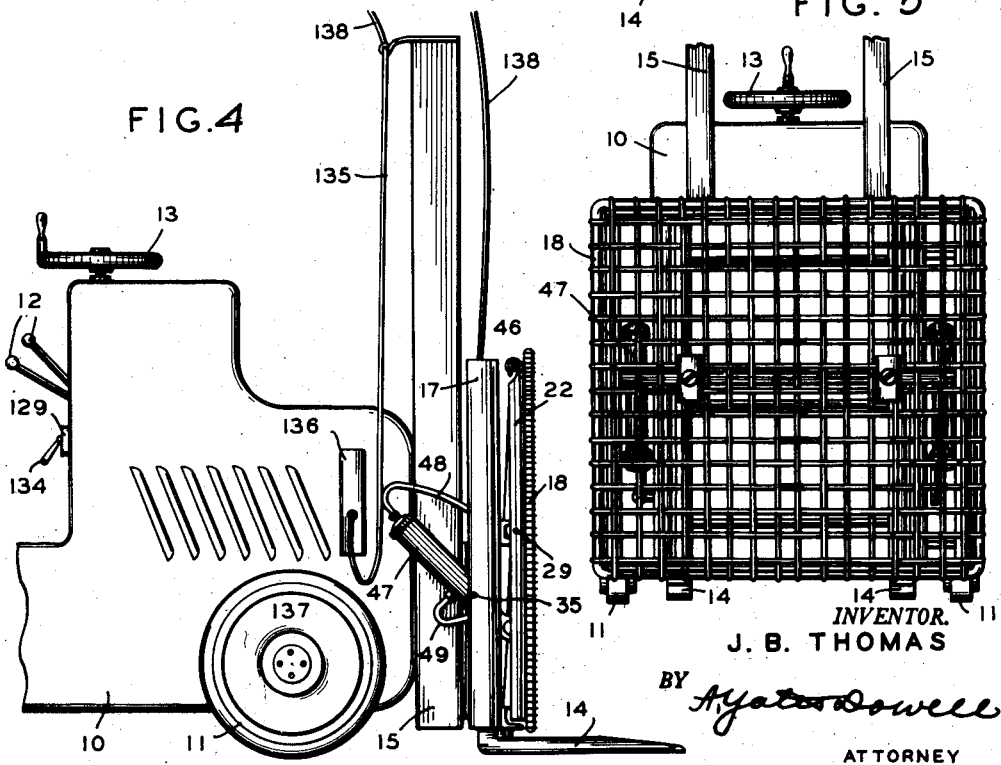
INVENTOR.
J. B. THOMAS
BY A. Yates Dowell
ATTORNEY May 19, 1953 J. B. THOMAS 2,639,051
PALLET STACK UNLOADER
Filed April 16, 1948 6 Sheets-Sheet 2
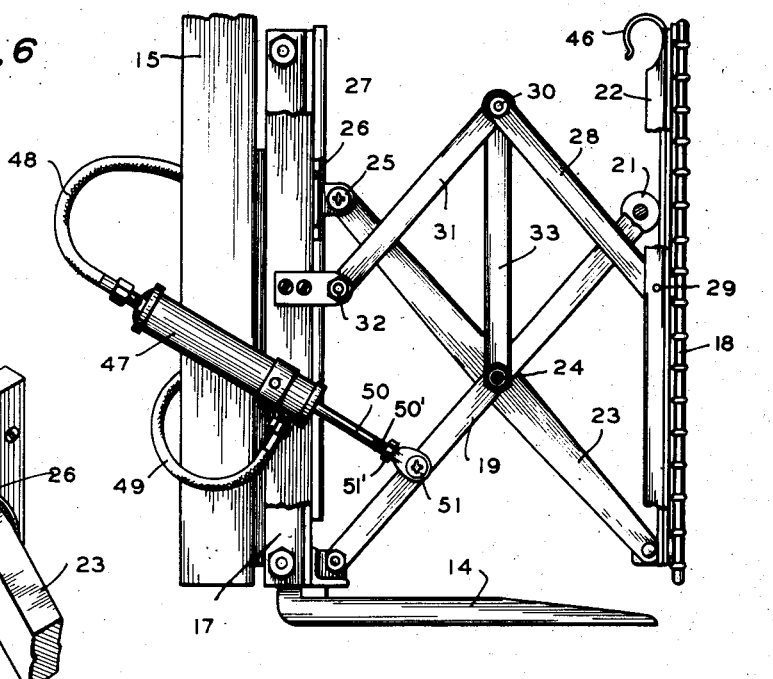
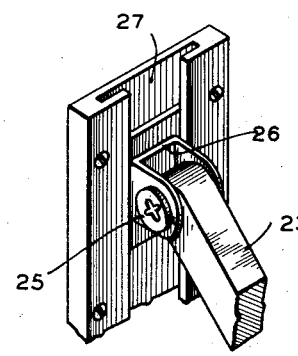
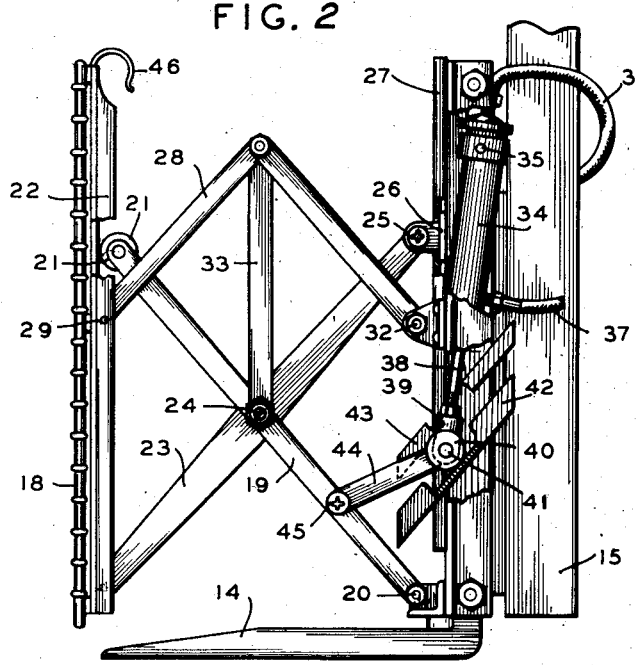
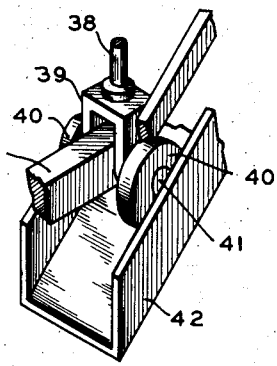
INVENTOR.
J. B. THOMAS
BY
A. Yates Dowell
ATTORNEY

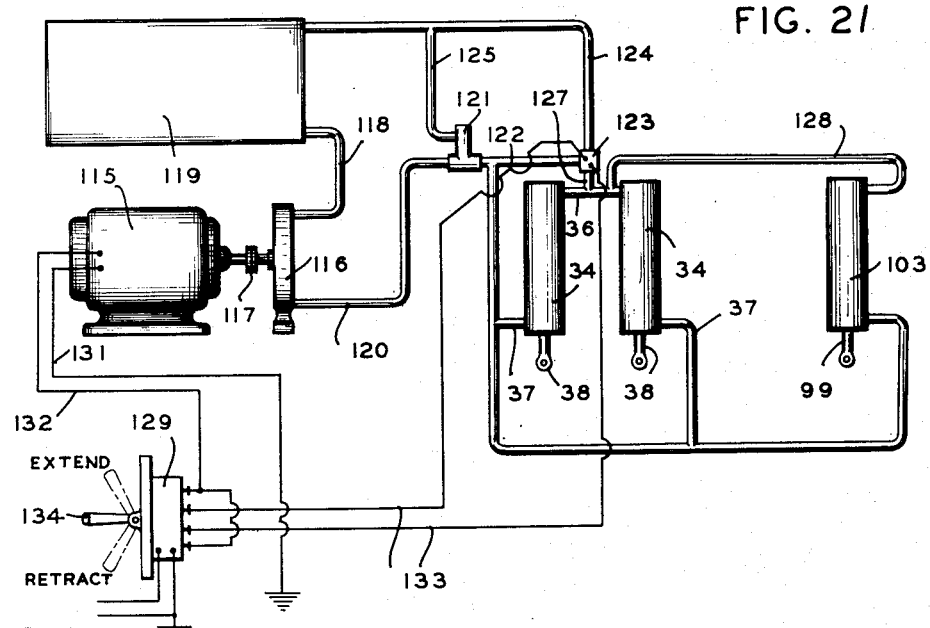
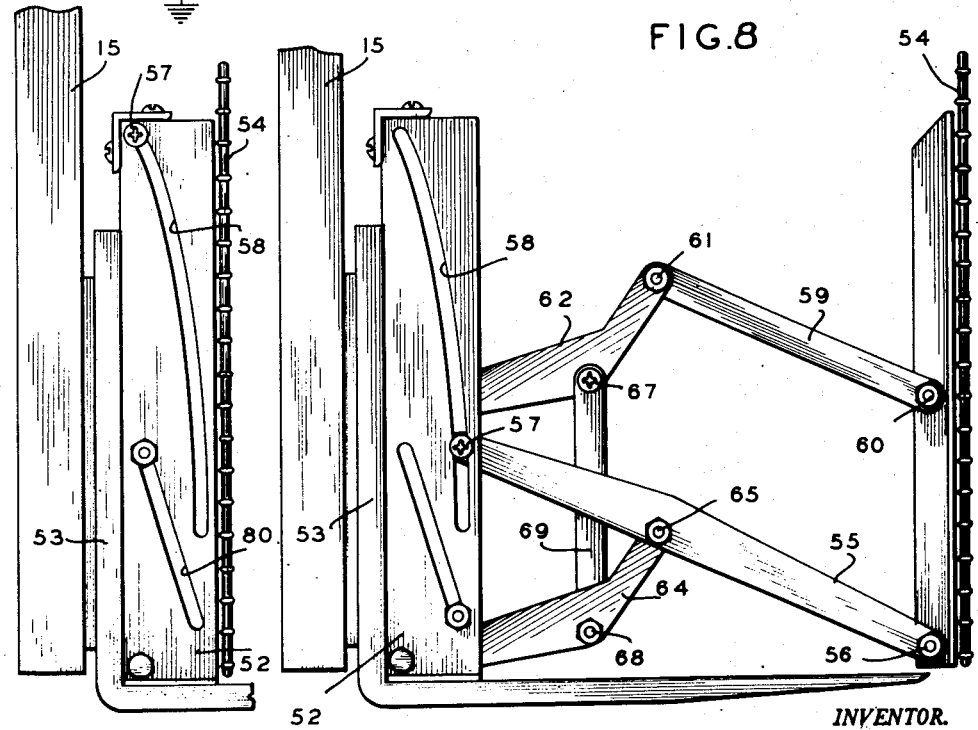

May 19, 1953 J. B. THOMAS 2,639,051
PALLET STACK UNLOADER
Filed April 16, 1948 6 Sheets-Sheet 4
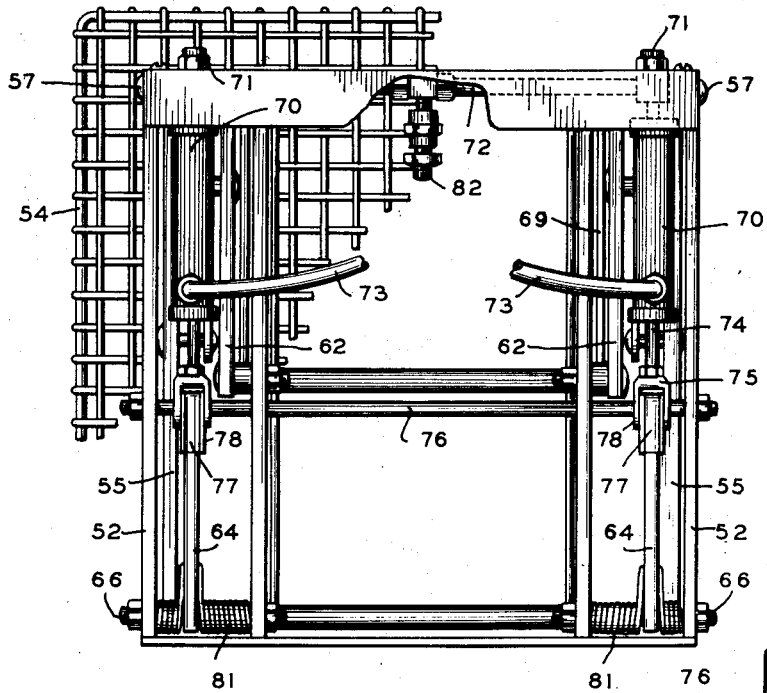
FIG. 13
FIG. 12
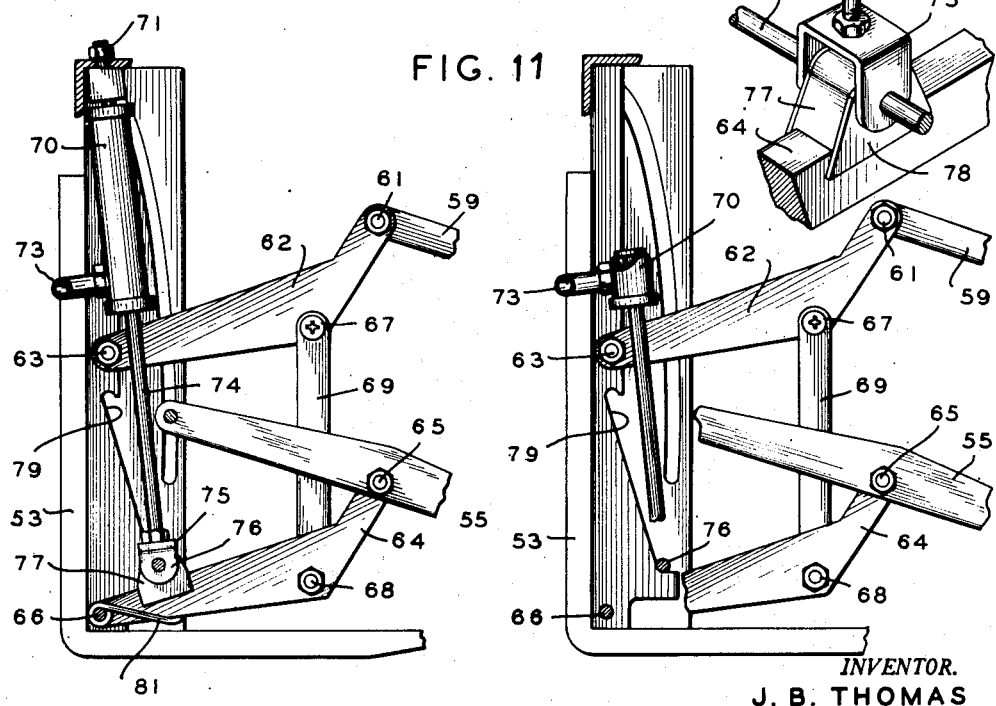
FIG. 11
FIG. 10
INVENTOR.
J. B. THOMAS
BY A. Yates Dowell
ATTORNEY

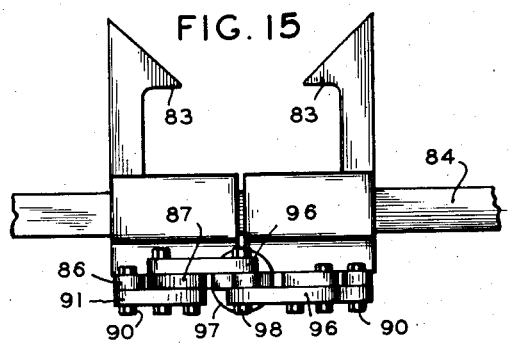
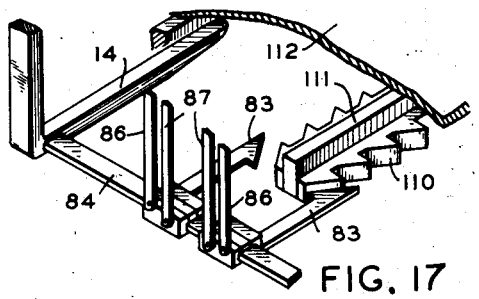
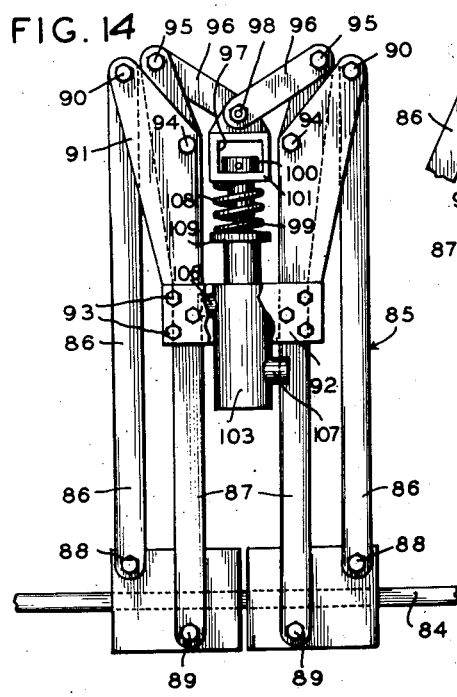
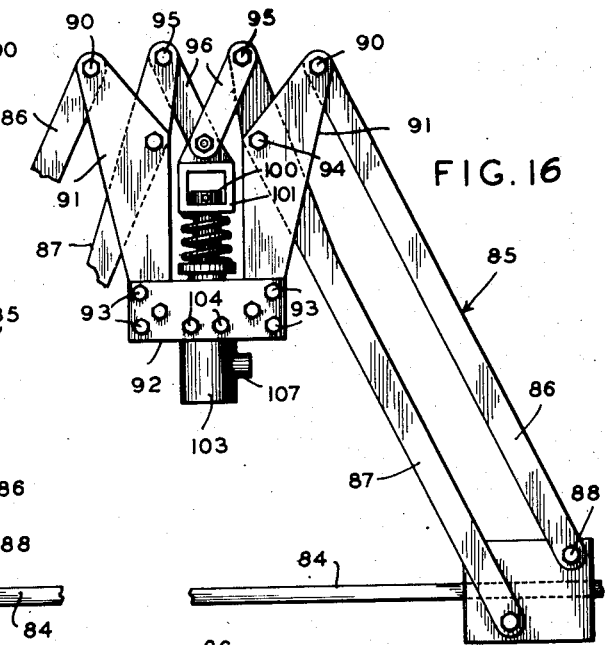
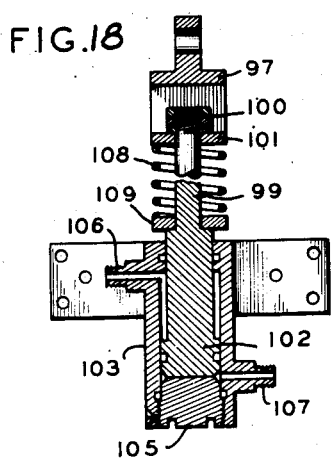
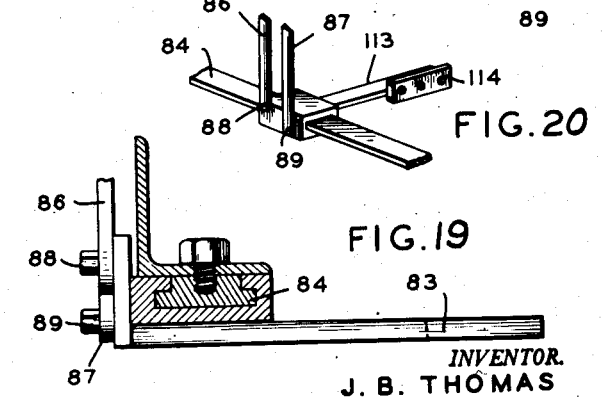
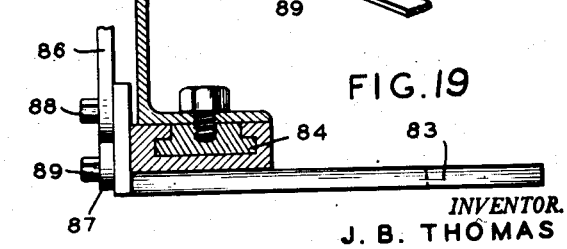

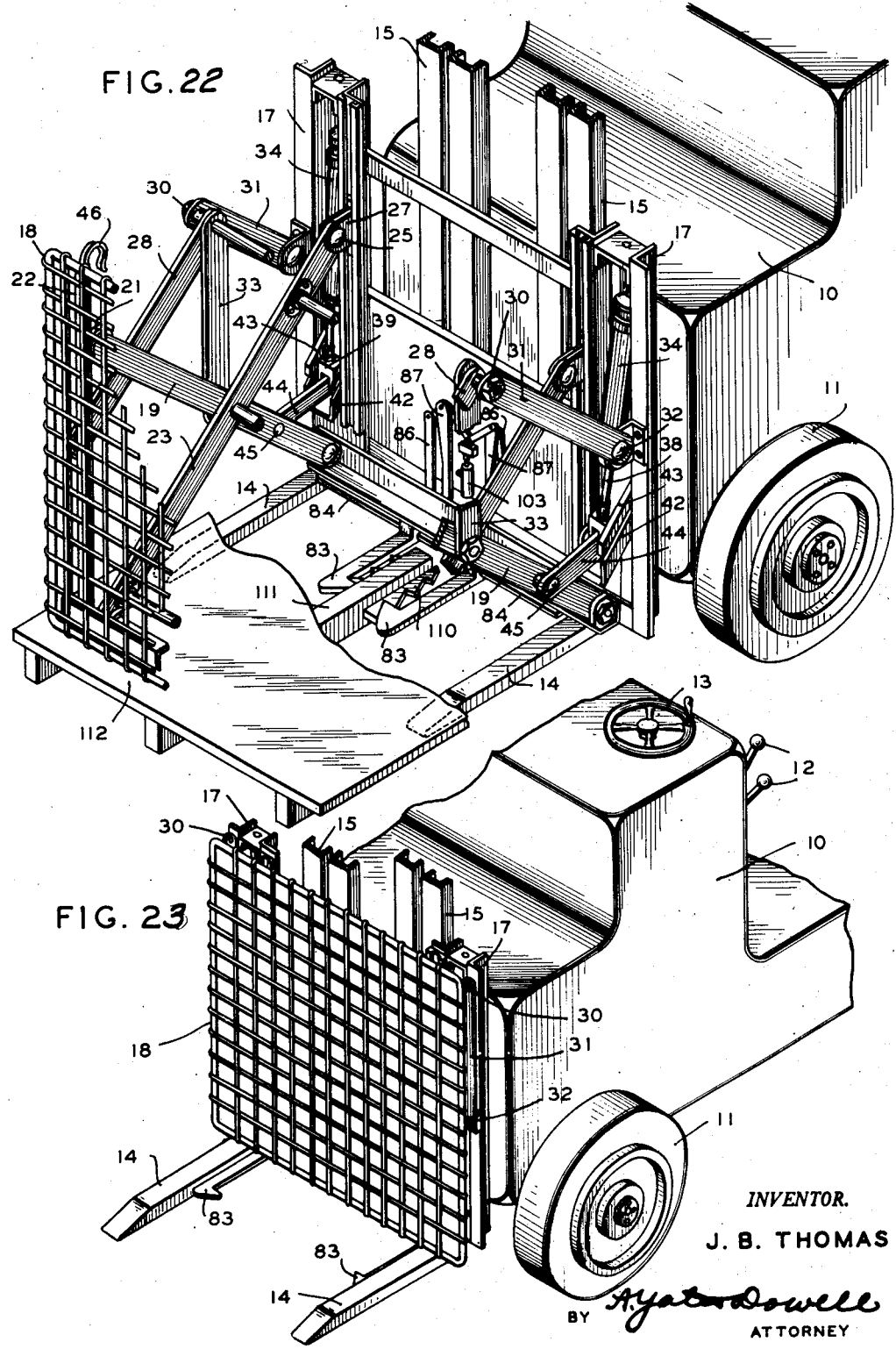

Patented May 19, 1953

2,639,051

UNITED STATES PATENT OFFICE 2,639,051

PALLET STACK UNLOADER

Julian B. Thomas, Fort Worth, Tex.

Application April 16, 1948, Serial No. 21,536

31 Claims. (Cl. 214—514)

This invention relates to material and article handling and more particularly to an unloading device for various uses including application to industrial trucks of the character usually referred to commercially as "fork" trucks.

Heretofore various types of unloading devices have been developed and utilized but these have not proved entirely satisfactory in that they have been large and bulky, utilizing space normally occupied by a portion of the load and have not been dependable in operation, resulting in substantially abandoning the use of such devices.

It is therefore an object of this invention to provide an unloading device of relatively simple and inexpensive construction which will retract to occupy a minimum of space and which may be extended a sufficient distance to unload any platten or pallet now in commercial use thus providing an efficient labor saving device and one in which the form of the stacked load is maintained during and after unloading.

It is a further object of this invention to provide an unloading device easily applicable to commercial fork trucks without the necessity of extensive alterations therein or which may be incorporated in new trucks at the factory.

It is a further object of this invention to provide an unloading device in which a relatively large force is developed which is at all times under the complete control of the operator and in which power for operation may be obtained from a self-contained hydraulic unit actuated by electric current from the truck or which may be operated by the use of proper conduits from the hydraulic system of certain types of trucks.

It is a further object of this invention to provide an unloading device incorporating means for gripping the platten or pallet during the unloading operation thus preventing undesired movement of the pallet on the forks, the gripping means being so constructed that it is not necessary to accurately position the truck with relation to the pallet, the gripping means operating effectively even with considerable misalignment.

It is a further object of this invention to provide a pushing device for moving a load wherever it is desired to accomplish a relatively large movement and yet will occupy a relatively small space when retracted.

Further objects and advantages of the invention will be apparent from the following specification taken in conjunction with the accompanying drawings, wherein:

Fig. 1 is an elevational view showing a portion of a conventional industrial fork truck having one form of an unloading device attached thereto showing the manner of obtaining power from the truck and with the unloading device in extended condition;

Fig. 2, an elevational view of the unloading device of Fig. 1 with parts removed to clearly show the operating means;

Fig. 3, a perspective detail view of a portion of the unloading device of Fig. 2;

Fig. 4, an elevational view of an industrial fork truck showing a modified form of unloading device attached thereto with the unloading device in collapsed or retracted condition;

Fig. 5, a front elevation of the truck and unloading device of Fig. 4 showing the grid or load engaging portion of the device;

Fig. 6, an elevational view showing the unloading device of Fig. 4 with parts removed for greater clarity;

Fig. 7, a perspective detail view showing the slide and trackway employed in the device of Fig. 6;

Fig. 8, an elevational view of a further modified form of unloading device shown in extended condition;

Fig. 9, an elevational view of the unloading device of Fig. 8 in retracted condition;

Figs. 10 and 11, fragmentary elevational views of the unloading device of Fig. 8 with parts omitted for greater clarity;

Fig. 12, a perspective detail view of the plunger connecting means employed in the device of Fig. 8;

Fig. 13, a fragmentary rear elevation of the unloading device of Fig. 8 in retracted condition and showing particularly the arrangement of the power cylinders;

Fig. 14, an elevational view of the pallet gripping means in gripping position;

Fig. 15, a top plan view of the gripping means of Fig. 14 in gripping position;

Fig. 16, a fragmentary elevational view of the gripping means of Fig. 14 in extended or released condition;

Fig. 17, a perspective fragmentary detail showing the gripping jaws and the teeth or projections provided on the pallet for engagement by the jaws;

Fig. 18, a fragmentary sectional view of the power cylinder and associated parts of the gripping means of Fig. 14;

Fig. 19, a fragmentary elevational view with parts in section showing the manner of mounting the gripping jaws;

Fig. 20, a perspective fragmentary detail view of a modified form of gripping jaw;

Fig. 21, a schematic diagram showing the hydraulic operating circuit and an electrical control circuit therefor;

Fig. 22, a fragmentary perspective view with parts broken away for greater clarity showing the unloading device of Fig. 1 and the pallet gripping means attached to a fork truck and engaging a pallet with the unloader in extended position;

Fig. 23, a fragmentary perspective view of the unloading device attached to a fork truck and in retracted position.

With continued reference to the drawings there is shown in Fig. 1 an industrial truck 10 commercially known as a fork truck and being provided with wheels 11, control levers 12 and steering wheel 13. The forward end of the truck 10 is provided with forks 14 adapted to engage beneath a pallet carrying a load, the forks 14 being mounted for vertical movement on upright rails 15 attached to the forward part of the truck.

As shown in Fig. 1 there is provided an unloading device 16 attached to a vertically movable carriage and movable up or down with the forks 14. The unloading device 16, as best shown in Fig. 2, is provided with rear mounting members 17 and a load-engaging generally rectangular grill 18. Obviously, if desired, grill 18 may be replaced by an imperforate member of metal, wood or any desired material.

Load engaging member 18 is connected to supporting members 17 by a series of links, link 19 being pivoted at 20 to the members 17, the upper end of the link 19 being provided with a roller 21 for engagement with a track 22 on the work engaging member 18. A second link 23 is pivotally mounted at its lower end on the member 18 and is pivoted substantially at its mid-point to link 19 as at 24. The upper end of link 23 is pivotally connected at 25 to a slidable member 26 received in a trackway 27 provided on the forward face of member 17. The member 18 is further connected to member 17 by a link 28 pivotally mounted on member 18 at 29, the opposite end of link 28 being pivotally connected at 30 to another link 31, the opposite end of which is pivotally connected to member 17 at 32. From pivot 30 a link 33 connects with pivot 24 passing through links 19 and 23.

In order to operate the device, there is provided an actuating pressure cylinder 34 pivotally mounted on member 17 at 35 to permit slight oscillatory or rocking movement of the cylinder, there being provided conduits 36 and 37 attached to the upper and lower ends of the cylinder. A piston rod 38 having a piston thereon is slidably received in cylinder 34, the lower end of the rod 38 terminating in a yoke 39 on which are rotatably mounted rollers 40 by means of an axle or pivot pin 41. Rollers 40 are mounted to travel in an inclined trackway 42 secured to members 17. Also adjacent the upper surface of roller 40 there is provided a rail 43 which normally prevents movement of roller 40 away from trackway 42. Also connected to yoke 39 by pivot pin 41 is a link 44 pivotally connected at its opposite end 45 to link 19 substantially at the mid-point thereof between pivoted end 20 and pivot 24.

It will thus be seen that by introducing fluid pressure into the upper end of cylinder 34 the piston and rod 38 will be moved downwardly thereby moving rollers 40 along trackway 42 and exerting a force through link 44 on link 19 which in turn will actuate the remaining linkage to extend or move outwardly the load engaging member 18.

When the unloading device is in retracted or collapsed condition, the pivot points of the linkage are substantially in line or on dead center, and in this condition the load engaging member 18 has a tendency to cock or tilt away from member 17. In order to prevent this undesirable condition, there is provided at the upper end of member 18 a hook-like member 46 beneath which the roller 21 is adapted to engage when the device is in retracted condition. This provides additional support for the upper end of member 18 and prevents tilting or cocking thereof. It will of course be understood that the linkage and actuating means therefor, together with the hook-like member 46, are duplicated at the opposite side of the device in order to provide a balanced construction.

A modified form of the unloading device of this invention is shown in Figs. 4 to 7, the linkage and load engaging member being substantially identical to that above-described in connection with the structure of Fig. 2.

The modification is in the manner of applying power to the device for extending and retracting the load engaging member 18, and in this form of the invention there is provided a power cylinder 47 having fluid pressure conduits 48 and 49 connected to the upper and lower ends of the cylinder. A piston rod 50 having a piston on the end thereof is slidably received in cylinder 47, the opposite end of the rod 50 being pivotally attached by a yoke 51 to link 19. Yoke 51 is adjustably secured to piston rod 50 by screw threaded engaging means 50' and is locked in adjusted position by lock nut 51'. It will thus be seen that by the introduction of fluid pressure to the cylinder 47 the piston and rod 50 will be moved inwardly or outwardly to actuate link 19 and associated linkages to extend or retract load engaging member 18.

A further modified form of the invention is disclosed in Figs. 8 to 13 and comprises upright members 52 attached to the vertically movable carriage 53 on the front of the truck. As in the previously described forms of the invention, there is provided a load engaging grill or member 54 connected to upstanding members 52 by a system of links and levers. The linkage system comprises a link 55 pivotally connected to the member 54 at 56, the opposite end of link 55 being provided with a pin 57 slidably received in a cam slot 58 in the upstanding member 52. A second link 59 is pivotally attached at its outer end 60 to load engaging member 54 and at its inner end 61 is pivotally attached to a bell crank lever 62 which is pivotally mounted at 63 on upstanding member 52. A second bell crank lever 64 is pivotally attached to link 55 at 65, the inner end of lever 64 being pivotally mounted on upstanding member 52 by a rod 66. Bell crank levers 62 and 64 are pivotally connected at substantially their mid points 67 and 68 by a link 69.

In order to extend or retract load engaging member 54 there is provided a pressure cylinder 70 fixed to the top of upstanding member 52 by a screw threaded fastening means or the like 71. Fluid pressure conduits 72 and 73 are connected to the upper and lower ends of the cylinder 70 for the introduction of fluid pressure thereto. Slidably received in cylinder 70 is a piston and piston rod 74 which is provided at its lower end with an adjustably mounted yoke 75. Pivotally mounted on yoke 75 by rod 76 is a shoe 77 which slidably engages the upper surface of bell crank lever 64. The shoe 77 is retained in engagement with lever 64 by depending ears 78 engaging the sides of the lever.

It will be seen that introduction of fluid pressure to the upper end of the cylinder 70 will cause the piston and rod 74 to move downwardly thus exerting a downward force on bell crank lever 64 which in turn will actuate the remaining linkage to extend the load engaging member 54. Shoe 77 is guided in its movement by engagement of rod 76 with cam surface 79 and slot 80. In order to retract load engaging member 54, there is provided a spring 81 received on rod 66 and engaging bell crank lever 64. Spring 81 is tensioned by the outward or extending movement of the device, and this tension serves to return the device to retracted position.

It is of course understood that the linkage system and power cylinder are duplicated at the opposite side of the device in order to provide a balanced structure, and the two power cylinders may be connected by the conduit 72 which is provided with a single fitting 82 for reception of a conduit leading to a source of fluid pressure.

In using unloading devices of this nature, it is common practice to engage the load to remove the same from the pallet and as the load is removed therefrom to either move the truck rearwardly under power or allow the force exerted by the unloading device to push the truck rearwardly. During this operation there is a tendency for the pallet to move off the forks supporting the same and since this is an undesirable result, means have been provided in connection with this invention whereby the pallet may be releasably clamped in position on the forks to prevent movement of the same while removing the load therefrom.

The unloading device comprising a part of this invention is best shown in Figs. 14 to 20 and comprises a pair of gripping jaws 83 slidably mounted on a cross bar 84 secured between the forks 14. Jaws 83 are moved toward and away from each other by a linkage system 85 which comprises a pair of links 86 and 87 pivotally connected to each jaw 83 at 88 and 89. Links 86 are pivotally connected at their upper ends 90 to supporting plates 91 mounted on a connecting plate 92 by screw threaded fasteners or the like 93. Links 87 are pivotally mounted adjacent their upper ends on plates 91 by pivot pins 94, the links 87 extending a short distance above pivots 94 and being provided with pivot pins 95 pivotally mounting links 96. Links 96 are pivotally secured to each other and to a yoke 97 by a pivot pin 98.

Yoke 97 is attached to a piston rod 99 for limited movement relative thereto, downward movement of the rod 99 being prevented by a head 100 engaging the lower connecting member 101 of yoke 97.

The lower end of piston rod 99 terminates in a piston 102 slidably received in cylinder 103 secured to connecting plate 92 by screw threaded fasteners or the like 104. The lower end of the cylinder 103 may be closed by a screw threaded plug 105 in order to provide ready access to the cylinder for repair or other work thereon. Cylinder 103 is also provided with fittings 106 and 107 adjacent the upper and lower ends thereof, respectively, for the reception of fluid pressure conduits.

In operation fluid pressure is applied through fitting 107 to the lower end of the cylinder 103 thus causing upward movement of the piston 102 and rod 99 which action resiliently transmits motion through coil spring 108 received around rod 99 between the lower connecting portion 101 of yoke 97 and a washer or shoulder 109 abutting the upper end of piston 102. The resulting motion is transmitted from yoke 97 through links 96 to links 87 thus moving jaws 83 inwardly toward each other. As a result of this motion, jaws 83 will engage behind projecting fingers 110 provided on the central longitudinal member 111 comprising a portion of the frame of a pallet 112. Jaws 83 will continue to grip or engage behind projections 110 during the movement of a load from the surface of the pallet, after the completion of which fluid pressure is applied through fitting 106 to the upper end of cylinder 103 to move the piston 102 downwardly, thus separating jaws 83 and permitting the truck to move rearwardly disengaging forks 14 from pallet 112.

A modified form of gripping jaw is shown in Fig. 20 in which jaws 113 may be provided with facings 114 on the inner sides thereof, these facings being formed of some resilient material such as rubber or the like and serving to frictionally grip the longitudinal frame member 111 of the pallet 112.

Since it is not always convenient when engaging forks 14 beneath a pallet 112 to accurately center the truck and forks with relation thereto, the above described structure for operating the gripping jaws 83 presents the further advantage that these jaws having a floating mounting thus permitting proper engagement and gripping of the member 111 even though considerable misalignment of the jaws with relation to this member be present. This action is permitted by reason of the fact that cylinder 103 supporting plate 92 and the links 86 and 87 pivotally mounted thereon and connecting with jaws 83 are free to move laterally in either direction in accordance with which of the jaws 83 first engages member 111.

For instance, as viewed in Fig. 17, if the right hand jaw 83 first engages the member 111, movement of this jaw will cease and the left hand jaw 83 will then continue to move toward member 111, the cylinder 103 and associated parts moving with this jaw until complete gripping of the member 111 is effected. Similarly the same action would take place, only in the opposite direction, if the left hand jaw 83 were first to engage member 111. The jaws 83 in their open or separated position present a sufficient spread to allow member 111 to pass therebetween, even though by the previous engagement jaws 83 may have been displaced a considerable distance laterally.

The above-described floating mounting which permits engagement of a truck with pallet with considerable misalignment present is extremely important since this materially reduces the time required for bringing a truck into proper position to lift and move the pallet 112 and the load carried thereby.

In order to properly actuate the unloading means and the gripping means in timed relation and to maintain these mechanisms under complete control of the operator at all times, there is provided a hydraulic or fluid pressure circuit for supplying the necessary actuating power and an electrical control circuit, the details of these circuits being shown schematically in Fig. 21.

For supplying the necessary fluid pressure there is provided a motor 115 driving a pump 116 through a conventional coupling 117. Pump 116 receives fluid through a conduit 118 from reservoir 119, the discharge of pump 116 passing through conduit 120 to a relief valve 121 and from this valve through a conduit 122 to a solenoid actuated valve 123. From solenoid valve 123 a return conduit 124 leads to reservoir 119 and relief valve 121 is also provided with a return conduit 125 leading to reservoir 119.

The lower end of cylinders 34 are connected by conduits 37 and pressure conduit 126 with conduit 122 at a point between relief valve 121 and 123. Conduit 126 also connects to the fitting 107 at the lower end of cylinder 103. This connection results in fluid pressure being at all times applied to the lower end of cylinders 34 and cylinder 103. The upper ends of cylinders 34 are connected by conduit 36 which in turn is connected through a conduit 127 to one connection of solenoid valve 123. The fitting 106 on the upper end of cylinder 103 is connected by a conduit 128 to conduit 36.

Control of the motor 115 and solenoid valve 123 is accomplished by a three-position switch 129 mounted on truck 10 in a position convenient to the operator. A source of electric power is obtained through a line 130 leading to switch 129 and to the frame of the unloading device. The motor 115 is provided with a power conducting line 131 leading to the frame of the unloading device and with a power conducting line 132 leading to the switch 129. The solenoid valve 123 is provided with operating power through lines 133 carried to switch 129.

Assuming the unloading device to be in a collapsed or retracted condition, in order to extend the same, it is only necessary to move the operating handle 134 of switch 129 to its uppermost position as indicated in broken lines in Fig. 21 at which time power will be applied to motor 115 thus actuating pump 116 and providing fluid pressure in the circuit. It is to be noted that this fluid pressure is applied to the lower ends of cylinders 34 and 103 through conduit 126 but the operation of switch 129 also supplies power to the solenoid valve 123 to permit flow of pressure fluid through conduits 122, 127, 36 and 128 to the upper ends of cylinders 34 and 103.

Since the areas of the upper surfaces of the pistons received in these cylinders are greater than the areas of the lower surfaces of these pistons, they will be moved outwardly of the cylinder due to the higher total pressure thereon and against the action of the fluid pressure in the lower portions of the cylinders. This results in a smooth continuous movement of the pistons since they are at all times under a load from both sides thereof, whereas if fluid pressure were applied to only one side thereof a jerky or uncontrolled movement would tend to result. During the outward movement of pistons 38 and 99, the fluid expelled from the lower portions of the cylinders 34 and 103 flows through conduit 106 into conduit 122, there mixing with the fluid being supplied from the pump 116.

When the pistons 38 and 99 reach their outward limit of travel, the excess fluid supplied by pump 116 is by-passed by relief valve 121 through conduit 125 back to the reservoir 119. At this time switch operating handle 134 may be moved to the central or neutral position at which time motor 115 will cease to operate and solenoid valve 123 will return to its normal condition.

When it is desired to retract the load engaging device and release the gripping jaws 83 the switch operating handle 134 is moved to the lowermost position as indicated in broken lines in Fig. 21 to again energize motor 115 and operate pump 116. Fluid pressure is thus again applied to the lower portions of cylinders 34 and 103 but due to the position of solenoid valve 123 will not be applied to the upper portions of these cylinders. Consequently reverse movement of pistons 38 and 99 will take place, the fluid expelled from the upper portions thereof being conducted through conduit 127, solenoid valve 123 and conduit 124 back to the reservoir 119. After completion of the return or retracting movement switch operating handle 134 may be returned to neutral position thus stopping motor 115 and pump 116.

The above described fluid pressure circuit and electrical control circuit therefore represents a very simple and efficient manner of properly operating and controlling the device of this invention, and it has been found entirely practical to provide a reservoir and motor driven pump directly on the unloading device, it being only necessary to provide electrical connections from the motor and from the solenoid valve to the control switch on the truck. These connections may be conveniently made through a cable 135 connected to a junction box 136 mounted at a convenient location on the truck 10, the cable 35 having sufficient slack in loops 137 and 138 to permit movement of the unloading device from a lowered position to an elevated position without imposing a strain on the cable 135 and also without permitting this cable to contact the ground.

If desired, in certain types of trucks where a source of hydraulic power is available, a suitable multi-conductor conduit may be substituted for the cable 135 thus transmitting fluid pressure from the truck to the unloading device for actuation of the various power cylinders. It is of course understood that the fluid pressure circuit and control therefor described above is as equally applicable to the modified forms of this invention as it is to the form in connection with which the description was made.

The hydraulic circuit and electric control circuit described above have been found to be very efficient and flexible in operation but it is of course understood that numerous other circuits may be developed and utilized which would obviously be within the scope of this invention.

The unloading device of this invention may be constructed in various sizes and capacities while still retaining the basic principles of design and operation described herein, and it has been found that it is entirely practical to construct such a device which may be extended a distance of approximately 40 inches and which when collapsed or retracted occupies a depth of only 4 inches. It has also been found entirely practical to provide a device of this nature which will exert a pushing or unloading force of approximately 4000 pounds, which is ample to remove any load now commonly carried by commercially available pallets.

Even though the device of this invention is composed of relatively extensive linkage systems, nevertheless these systems may be constructed of parts which are relatively economical to produce and which when assembled are substantially fool-proof since there are no critical adjustments which must be made and continually changed in order to maintain the device in proper operating condition. The device is easily applicable to a conventional truck with a minimum of alterations therein and of course may be directly applied to new trucks at the factory with no difficulty.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a plurality of links connecting said load engaging member and said upstanding members, certain of said links being slidably mounted on said upstanding members and others of said links being pivotally mounted thereon, said links being constructed and arranged to restrain movement of said load engaging member to substantially a straight line while maintaining said load engaging member in a vertical position substantially parallel to said upstanding members, power actuating means for said load engaging member comprising a pair of pressure cylinders, pistons and piston rods slidably received in said cylinders, means connecting the outer ends of said piston rods with certain of said links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, pallet gripping means disposed between said pallet engaging forks, said gripping means comprising a pair of opposed jaws slidably mounted on a portion of said carriage, a fluid pressure cylinder having a piston slidably received therein, a pair of links pivotally connected to said piston, said links being also pivotally connected to a second pair of links pivotally mounted from said cylinder and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion, regardless of any misalignment thereof, a source of fluid pressure on said unloading device and means on said truck comprising a switch for controlling the operation of said fluid pressure source and for controlling a solenoid valve whereby fluid pressure is simultaneously introduced to said pressure cylinders and said pressure cylinder associated with said gripping means whereby said pallet is restrained against movement during actuation of said load engaging member to eject a load from said pallet and whereby said switch may be operated for retracting said load engaging member and to release said gripping means.

2. For use with a commercial lift truck having pallet engaging forks mounted for vertical movement thereon, an unloading device comprising members secured to said forks, a load engaging member, a plurality of links connecting said load engaging member and said members, said links being constructed and arranged to restrain movement of said load engaging member to substantially a straight line while maintaining said load engaging member in a vertical position substantially parallel to said members, power actuating means for said load engaging member comprising a pair of pressure cylinders, pistons and piston rods slidably received in said cylinders, means connecting the outer ends of said piston rods with certain of said links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, pallet gripping means comprising a pair of opposed jaws slidably mounted on said forks, a fluid pressure cylinder having a piston slidably received therein, a pair of links pivotally connected to said piston, said links being also pivotally connected to a second pair of links pivotally mounted from said cylinder and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion, regardless of any misalignment thereof, a source of fluid pressure on said unloading device and means on said truck comprising a switch for controlling the operation of said fluid pressure source and for controlling a solenoid valve whereby fluid pressure is simultaneously introduced to said pressure cylinders and said pressure cylinder associated with said gripping means whereby said pallet is restrained against movement during actuation of said load engaging member to eject a load from said pallet and whereby said switch may be operated for retracting said load engaging member and to release said gripping means.

3. For use with a commercial lift truck having pallet engaging forks mounted for vertical movement thereon, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member, means connecting said power actuating means with certain of said links, means for operating said power actuating means resulting in extension of said load engaging member, and means for operating said actuating means in the reverse direction to retract said load engaging member, pallet gripping means disposed between said pallet engaging forks, said gripping means comprising a pair of opposed jaws slidably mounted on said forks, a fluid pressure cylinder having a piston slidably received therein, a pair of links pivotally connected to said piston, said links being also pivotally connected to a second pair of links pivotally mounted from said cylinder, and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion, regardles of any misalignment thereof, a source of power on said unloading device, and means on said truck comprising a switch for controlling the operation of said power source whereby power is simultaneously applied to said power actuating means and said pressure cylinder associated with said gripping means whereby said pallet is restrained against movement during actuating of said load engaging member to eject a load from said pallet and whereby said switch may be operated for retracting said load engaging member and to release said gripping means.

4. For use with a commercial lift truck having pallet engaging forks mounted for vertical movement thereon, an unloading device comprising members secured to said forks, a load engaging member, means connecting said load engaging member and said members, said means being constructed and arranged to restrain movement of said load engaging member to a substantially straight line while maintaining said load engaging member in a vertical position substantially parallel to said members, power actuating means for said load engaging member, means connecting said power actuating means with said means connecting said load engaging member and said members, whereby upon operation of said power actuating means in one direction said load engaging member is extended, and upon operation of said power actuating means in the reverse direction said load engaging member is retracted, pallet gripping means disposed between said pallet engaging forks, said gripping means comprising a pair of opposed jaws slidably mounted on said forks, a fluid pressure cylinder having a piston slidably received therein, a pair of links pivotally connected to said piston, said links being also pivotally connected to a second pair of links pivotally mounted from said cylinder and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion, regardless of any misalignment thereof, a source of power on said unloading device, and means on said truck comprising a switch for controlling the operation of said power source whereby power is simultaneously applied to said power actuating means and said pressure cylinder associated with said gripping means, whereby said pallet is restrained against movement during actuating of said load engaging member to eject a load from said pallet and whereby said switch may be operated for retracting said load engaging member and to release said gripping means.

5. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a plurality of links connecting said load engaging member and said upstanding members, certain of said links being slidably mounted on said upstanding members, and others of said links being pivotally mounted thereon, said links being constructed and arranged to restrain movement of said load engaging member to a substantially straight line, while maintaining said load engaging member in a vertical position substantially parallel to said upstanding members, power actuating means for said load engaging member comprising a pair of pressure cylinders, pistons and piston rods slidably received in said cylinder means connecting the outer ends of said piston rods with certain of said links, means for introducing fluid pressure to the upper portion of said cylinder to move said piston rods outwardly therefrom, said movement resulting in extension of said load engaging member and means for introducing fluid pressure to the lower portion of said cylinder to move said piston rods inwardly, said inward movement resulting in retraction of said load engaging member, pallet gripping means disposed between said pallet engaging forks, said gripping means being slidably mounted on a portion of said carriage, a fluid pressure cylinder having a piston slidably received therein, links connecting said piston with said gripping means, links pivotally connecting said gripping means and said cylinder thus providing a floating support for said cylinder on said gripping means, said links connecting said piston and said gripping means serving to transmit motion from said piston to said gripping means, whereby upon introduction of fluid pressure to said cylinder said gripping means will engage and grip a portion of said pallet thus preventing movement thereof, relative to said forks, the floating mounting of said cylinder permitting engagement of said gripping means with said pallet portion, regardless of any misalignment thereof, a source of fluid pressure on said unloading device and means on said truck comprising a switch for controlling the operation of said fluid pressure source and for controlling a solenoid valve whereby fluid pressure is simultaneously introduced to said pressure cylinders and said pressure cylinder associated with said gripping means whereby said pallet is restrained against movement during actuation of said load engaging member to eject a load from said pallet and whereby said switch may be operated for retracting said load engaging member and to release said gripping means.

6. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a plurality of links connecting said load engaging member and said upstanding members, certain of said links being slidably mounted on said upstanding members, and others of said links being pivotally mounted thereon, said links being constructed and arranged to restrain movement of said load engaging member to a substantially straight line, while maintaining said load engaging member in a vertical position substantially parallel to said upstanding members, power actuating means for said load engaging member comprising a pair of pressure cylinders, pistons and piston rods slidably received in said cylinder means connecting the outer ends of said piston rods with certain of said links means for introducing fluid pressure to the upper portion of said cylinder to move said piston rods outwardly therefrom, said movement resulting in extension of said load engaging member and means for introducing fluid pressure to the lower portion of said cylinder to move said piston rods inwardly, said inward movement resulting in retraction of said load engaging member, pallet gripping means disposed between said pallet engaging forks, said gripping means being slidably mounted on a portion of said carriage, power actuating means for said gripping means, means for connecting said power actuating means with said gripping means for movement thereof and providing a floating support for said power actuating means thereon, whereby upon operation of said power actuating means said gripping means will engage and grip a portion of said pallet thus preventing movement thereof relative to said forks the floating mounting of said power actuating means permitting engagement of said gripping means with said pallet regardless of any misalignment thereof, a source of power on said unloading device and means on said truck for controlling the operation of said power source, whereby power is simultaneously introduced to said pressure cylinders and to said power actuating means for said gripping means whereby said pallet is restrained against movement during actuation of said load engaging member to eject a load from said pallet and whereby said control means may be operated for retraction of said load engaging member and to release said gripping means.

7. For use with a commercial lift truck having vertical rails secured to the front of said truck, a carriage slidably mounted for vertical movement on said rails and pallet engaging forks secured to said carriage, an unloading device comprising upstanding members secured to said carriage a load engaging member, a plurality of links connecting said load engaging member and said upstanding members, certain of said links being slidably mounted on said upstanding members and others of said links being pivotally mounted thereon, said links being constructed and arranged to restrain movement of said load engaging member to substantially a straight line while maintaining said load engaging member in a vertical position substantially parallel to said upstanding members, power actuating means for said load engaging member comprising a pair of pressure cylinders, pistons and piston rods slidably received in said cylinders, means connecting the outer ends of said piston rods with certain of said links, a source of fluid pressure on said unloading device, and means on said truck comprising a switch for controlling the operation of said fluid pressure source and for controlling a solenoid valve whereby fluid pressure may be introduced to the upper portion of said cylinders to move said piston rods outwardly therefrom, said movement resulting in extension of said load engaging member thereby ejecting a load from said pallet and whereby said switch may be operated for introducing fluid pressure to the lower portion of said cylinders to move said piston rods inwardly, said inward movement resulting in retraction of said load engaging member.

8. For use with a commercial lift truck having pallet engaging forks mounted for vertical movement thereon, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member comprising a pair of pressure cylinders, pistons and piston rods slidably received in said cylinders, means connecting the outer ends of said piston rods with certain of said links, a source of fluid pressure on said unloading device and means on said truck comprising a switch for controlling the operation of said fluid pressure source, and for controlling a solenoid valve whereby fluid pressure is introduced to the upper portion of said cylinder to move said piston rod outwardly therefrom said movement resulting in extension of said load engaging member thereby ejecting a load from said pallet and whereby said switch may be operated for introducing fluid pressure to the lower portion of said cylinder to move said piston rods inwardly, said inward movement resulting in retraction of said load engaging member.

9. A pushing device comprising base members, a load engaging member, a plurality of links connecting said load engaging member and said base member, certain of said links being slidably mounted on said base members and others of said links being pivotally mounted thereon, said links being constructed and arranged to restrain movement of said load engaging member to a substantially straight line while maintaining said load engaging member in a position substantially parallel to said base members, power actuating means for said load engaging member comprising a pair of pressure cylinders, pistons and piston rods slidably received in said cylinders, means connecting the outer ends of said piston rods with certain of said links, a source of fluid pressure on said pushing device, and means comprising a switch for controlling the operation of said fluid pressure source and for controlling a solenoid valve whereby fluid pressure may be introduced to one portion of said cylinders to move said piston rods outwardly therefrom, said movement resulting in extension of said load engaging member and whereby said switch may be operated for introducing fluid pressure to another portion of said cylinders to move said piston rods inwardly, said inward movement resulting in retraction of said load engaging member.

10. A pushing device comprising base members, a load engaging member, a plurality of links connecting said load engaging member and said base members, said links being constructed and arranged to restrain movement of said load engaging member to a substantially straight line while maintaining said load engaging member in a position substantially parallel to said base members, power actuating means for said load engaging member comprising a pair of pressure cylinders, pistons and piston rods slidably received in said cylinders, means connecting the outer ends of said piston rods with certain of said links, a source of fluid pressure on said pushing device and means comprising a switch for controlling the operation of said fluid pressure source and for controlling a solenoid valve whereby said power actuating means is controlled.

11. For use with a commercial lift truck having pallet engaging forks mounted for vertical movement thereon a pallet gripping means disposed between said pallet engaging forks, said gripping means comprising a pair of opposed jaws slidably mounted on said forks, a fluid pressure cylinder having a piston slidably received therein, a pair of links pivotally connected to said pistons, said links being also pivotally connected to a second pair of links pivotally mounted from said cylinder and the opposite ends of said second pair of links being pivotally connected to said jaws, a third pair of links pivotally mounted from said cylinder and secured at the opposite ends to said jaws, said second and third pairs of links thus providing a floating support for said cylinder on said jaws, said second pair of links serving to transmit motion from said piston to said jaws for movement toward and away from each other whereby upon introduction of fluid pressure to said cylinder, said jaws will engage and grip a portion of said pallet thus preventing movement thereof relative to said forks, the floating mounting of said cylinder permitting engagement of said jaws with said pallet portion regardless of any misalignment thereof, a source of fluid pressure and means on said truck for controlling the application of fluid pressure to said cylinder for gripping and releasing said pallet.

12. For use with a commercial lift truck having pallet engaging forks mounted for vertical movement thereon pallet gripping means disposed between said pallet engaging forks, said gripping means being slidably mounted on said forks, a fluid pressure cylinder having a piston slidably received therein, links connecting said piston with said gripping means, links pivotally connecting said gripping means and said cylinder thus providing a floating support for said cylinder on said gripping means, said links connecting said piston and said gripping means serving to transmit motion from said piston to said gripping means whereby upon introduction of fluid pressure to said cylinder said gripping means will engage and grip a portion of said pallet thus preventing movement thereof relative to said forks, the floating mounting of said cylinder permitting engagement of said gripping means with said pallet portion regardless of any misalignment thereof, a source of fluid pressure and means on said truck to control the application of fluid pressure to said cylinder whereby said gripping means will grip and release said pallet.

13. For use with a commercial lift truck having pallet engaging forks mounted for movement thereof, pallet gripping means disposed between said pallet engaging forks said gripping means being slidably mounted on said forks, power actuating means for said gripping means, means for connecting said power actuating means with said gripping means for movement thereof and providing a floating support for said power actuating means thereon whereby upon operation of said power actuating means said gripping means will engage and grip a portion of said pallet thus preventing movement thereof relative to said forks, the floating mounting of said power actuating means permitting engagement of said gripping means with said pallet regardless of any misalignment thereof, a source of power and means on said truck for controlling the application of power to said power actuating means, whereby said gripping means will grip and release said pallet.

14. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof being pivotally mounted on slides received in vertical tracks in said upstanding members, a second pair of links pivotally secured at one end adjacent the lower end of said upstanding members, the opposite ends of said second pair of links being provided with rollers engaging vertical tracks on said load engaging member, a plurality of pivotally related links connecting said load engaging member with said upstanding members and restraining movement of said load engaging member to a substantially straight line while maintaining said load engaging member in a vertical position substantially parallel to said upstanding members, power actuating means for said load engaging member comprising a pair of pressure cylinders mounted on said upstanding members, pistons and piston rods slidably received in said cylinders the outer ends of said piston rods terminating in yokes provided with rollers received in inclined trackways, rails secured in spaced opposed relation to said inclined trackways and being constructed and arranged to prevent movement of said rollers away from said trackways, links connecting said yokes with said second pair of links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, and hook members secured adjacent the upper edge of said load engaging member and engageable by said rollers when in retracted position whereby outward tilting of said load engaging member is prevented, a source of fluid pressure on said unloading device and means on said truck comprising a switch for controlling the operation of said fluid pressure source and for controlling a solenoid valve whereby fluid pressure is introduced to said pressure cylinders to actuate said load engaging member to eject a load from said pallet and whereby said switch may be operated for retracting said load engaging member.

15. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof being pivotally mounted on slides received in vertical tracks in said upstanding members, a second pair of links pivotally secured at one end adjacent the lower end of said upstanding members, the opposite ends of said second pair of links being provided with rollers engaging vertical tracks on said load engaging member, a plurality of pivotally related links connecting said load engaging member with said upstanding members and restraining movement of said load engaging member to a substantially straight line while maintaining said load engaging member in a vertical position substantially parallel to said upstanding members, power actuating means for said load engaging member comprising a pair of pressure cylinders mounted on said upstanding members, pistons and piston rods slidably received in said cylinders, the outer ends of said piston rods terminating in yokes provided with rollers received in inclined trackways, rails secured in spaced opposed relation to said inclined trackways and being constructed and arranged to prevent movement of said rollers away from said trackways, links connecting said yokes with said second pair of links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, and hook members secured adjacent the upper edge of said load engaging member and engageable by said rollers when in retracted position whereby outward tilting of said load engaging member is prevented, a source of fluid pressure on said unloading device and means on said truck comprising a switch for controlling the operation of said fluid pressure source and for controlling a solenoid valve whereby operation of said power actuating means is controlled.

16. For use with a commercial lift truck having pallet engaging forks mounted for vertical movement therein, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member comprising a pair of pressure cylinders mounted on said members, pistons and piston rods slidably received in said cylinders, the outer ends of said piston rods terminating in yokes provided with rollers received in inclined trackways, rails secured in spaced opposed relation to said inclined trackways and being constructed and arranged to prevent movement of said rollers away from said trackways, links connecting said yokes with certain of said first mentioned connecting links, means for introducing fluid pressure to the upper portion of said cylinders to move said piston rods outwardly therefrom, said movement resulting in extension of said load engaging member, means for introducing fluid pressure to the lower portion of said cylinders to move said piston rods inwardly, said inward movement resulting in retraction of said load engaging member, means secured adjacent the upper edge of said load engaging member and engageable by a portion of said links when in retracted position whereby outward tilting of said load engaging member is prevented, a source of fluid pressure on said unloading device, and means on said truck comprising a switch for controlling the operation of said fluid pressure source and for controlling a solenoid valve whereby the operation of said power actuating means is controlled.

17. For use with a commercial lift truck having pallet engaging forks mounted for vertical movement thereon, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member comprising a pair of pressure cylinders mounted on said members, pistons and piston rods slidably received in said cylinders, means on the outer ends of said piston rods engaging an inclined trackway, means connecting said inclined trackway engaging means with certain of said links, means for introducing fluid pressure to the upper portion of said cylinders to move said piston rods outwardly therefrom, said movement resulting in extension of said load engaging member, means for introducing fluid pressure to the lower portion of said cylinders to move said piston rods inwardly, said inward movement resulting in retraction of said load engaging member, a source of fluid pressure on said unloading device and means on said truck comprising a switch for controlling the operation of said fluid pressure source and for controlling a solenoid valve whereby operation of said power actuating means is controlled.

18. A pushing device comprising base members, a load engaging member, a plurality of links connecting said load engaging member and said base members, said links being constructed and arranged to restrain movement of said load engaging member to a substantially straight line while maintaining said load engaging member in a position substantially parallel to said base members, power actuating means for said load engaging member comprising a pair of pressure cylinders mounted on said base members, pistons and piston rods slidably received in said cylinders, the outer ends of said piston rods terminating in yokes provided with rollers received in inclined trackways, rails secured in spaced opposed relation to said inclined trackways and being constructed and arranged to prevent movement of said rollers away from said trackways, links connecting said yokes with certain of said first mentioned connecting links, means for introducing fluid pressure to one portion of said cylinders to move said piston rods outwardly therefrom, said movement resulting in extension of said load engaging member, means for introducing fluid pressure to the opposite portion of said cylinders to move said piston rods inwardly, said movement resulting in retraction of said load engaging member, a source of fluid pressure on said pushing device and means comprising a switch for controlling the operation of said fluid pressure source and for controlling a solenoid valve whereby the operation of said power actuating means is controlled.

19. A pushing device comprising base members, a load engaging member, a plurality of links connecting said load engaging member and said base members, said links being constructed and arranged to restrain movement of said load engaging member to a substantially straight line while maintaining said load engaging member in a position substantially parallel to said base members, power actuating means for said load engaging member comprising a pair of pressure cylinders mounted on said base members, pistons and piston rods slidably received in said cylinders, means on the outer ends of said piston rods engaging an inclined trackway, means connecting said inclined trackway engaging means with certain of said links, means for introducing fluid pressure to one portion of said cylinders to move said piston rods outwardly therefrom, said movement resulting in extension of said load engaging member, means for introducing fluid pressure to the opposite portion of said cylinders to move said piston rods inwardly, said inward movement resulting in retraction of said load engaging member, a source of fluid pressure on said pushing device and means for controlling the operation of said fluid pressure source and for controlling the operation of said power actuating means.

20. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof being pivotally mounted on slides received in vertical tracks in said upstanding members, a second pair of links pivotally secured at one end adjacent the lower end of said upstanding members, the opposite ends of said second pair of links being provided with rollers engaging vertical tracks on said load engaging member, a plurality of pivotally related links connecting said load engaging member with said upstanding members and restraining movement of said load engaging member to substantially a straight line while maintaining said load engaging member in a vertical position substantially parallel to said upstanding members, power actuating means for said load engaging member comprising a pair of pressure cylinders pivotally mounted on said upstanding members, pistons and piston rods slidably received in said cylinders, the outer ends of said piston rods terminating in adjustably mounted yokes, means pivotally securing said yokes to said second pair of links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, and hook members secured adjacent the upper edge of said load engaging member and engageable by said rollers when in retracted position whereby outward tilting of said load engaging member is prevented, pallet gripping means disposed between said pallet engaging forks, said gripping means comprising a pair of opposed jaws slidably mounted on a portion of said carriage, a fluid pressure cylinder having a piston slidably received therein, a pair of links pivotally connected to said piston, said links being also pivotally connected to a second pair of links pivotally mounted from said cylinder and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion regardless of any misalignment thereof, a source of fluid pressure on said unloading device and means on said truck comprising a switch for controlling the operation of said fluid pressure source and for controlling a solenoid valve whereby fluid pressure is simultaneously introduced to said pressure cylinders and said pressure cylinder associated with said gripping means whereby said pallet is restrained against movement during actuation of said load engaging member to eject a load from said pallet and whereby said switch may be operated for retracting said load engaging member and to release said gripping means.

21. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof being pivotally mounted on slides received in vertical tracks in said upstanding members, a second pair of links pivotally secured at one end adjacent the lower end of said upstanding members, the opposite ends of said second pair of links being provided with rollers engaging vertical tracks on said load engaging member, a plurality of pivotally related links connecting said load engaging member with said upstanding member and restraining movement of said load engaging member to a substantially straight line while maintaining said load engaging member in a vertical position substantially parallel to said upstanding members, power actuating means for said load engaging member comprising a pair of pressure cylinders pivotally mounted on said upstanding members, pistons and piston rods slidably received in said cylinders, the outer ends of said piston rods terminating in adjustably mounted yokes, means pivotally securing said yokes to said second pair of links, means for introducing fluid pressure to the upper portion of said cylinders to move said piston rods outwardly therefrom, said movement resulting in extension of said load engaging member, and means for introducing fluid pressure to the lower portion of said cylinders to move said piston rods inwardly, said inward movement resulting in retraction of said load engaging member, and hook members secured adjacent the upper edge of said load engaging member and engageable by said rollers when in retracted position whereby outward tilting of said load engaging member is prevented, a source of fluid pressure on said unloading device and means on said truck comprising a switch for controlling the operation of said fluid pressure source and for controlling a solenoid valve whereby operation of said power actuating means is controlled.

22. For use with a commercial lift truck having pallet engaging forks mounted for vertical movement therein, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member comprising a pair of pressure cylinders pivotally mounted on said members, pistons and piston rods slidably received in said cylinders, the outer ends of said piston rods terminating in adjustably mounted yokes, means pivotally securing said yokes to certain of said links, means for introducing fluid pressure to the upper portion of said cylinders to move said piston rods outwardly therefrom, said movement resulting in extension of said load engaging member and means for introducing fluid pressure to the lower portion of said cylinders to move said piston rods inwardly, said inward movement resulting in retraction of said load engaging member, means secured adjacent the upper edge of said load engaging member and engageable by a portion of said links when in retracted position whereby outward tilting of said load engaging member is prevented, a source of fluid pressure on said unloading device and means on said truck comprising a switch for controlling the operation of said fluid pressure source and for controlling a solenoid valve whereby the operation of said power actuating means is controlled.

23. For use with a commercial lift truck having pallet engaging forks mounted for vertical movement thereon, an unloading device comprising members secured to said forks, a load engaging member, a plurality of links connecting said load engaging member and said members, said links being constructed and arranged to restrain movement of said load engaging member to a substantially straight line while maintaining said load engaging member in a vertical position substantially parallel to said members, power actuating means for said load engaging member comprising a pair of pressure cylinders mounted on said members, pistons and piston rods slidably received in said cylinders, means on the outer ends of said rods pivotally connecting said rods to certain of said links, means for introducing fluid pressure to the upper portion of said cylinders to move said piston rods outwardly therefrom, said movement resulting in extension of said load engaging member, means for introducing fluid pressure to the lower portion of said cylinders to move said piston rods inwardly, said inward movement resulting in retraction of said load engaging member, a source of fluid pressure on said unloading device and means on said truck comprising a switch for controlling the operation of said fluid pressure source and for controlling a solenoid valve whereby operation of said power actuating means is controlled.

24. A pushing device comprising base members, a load engaging member, a plurality of links connecting said load engaging member and said base members, said links being constructed and arranged to restrain movement of said load engaging member to a substantially straight line while maintaining said load engaging member in a position substantially parallel to said base members, power actuating means for said load engaging member comprising a pair of pressure cylinders pivotally mounted on said base members, pistons and piston rods slidably received in said cylinders, the outer ends of said piston rods terminating in adjustably mounted yokes, means pivotally securing said yokes to certain of said links, means for introducing fluid pressure to one portion of said cylinders to move said piston rods outwardly therefrom, said movement resulting in extension of said load engaging member, and means for introducing fluid pressure to the opposite portion of said cylinders to move said piston rods inwardly, said inward movement resulting in retraction of said load engaging member, a source of fluid pressure on said pushing device and means comprising a switch for controlling the operation of said fluid pressure source and for controlling a solenoid valve whereby the operation of said power actuating means is controlled.

25. A pushing device comprising base members, a load engaging member, a plurality of links connecting said load engaging member and said base members, said links being constructed and arranged to restrain movement of said load engaging member to a substantially straight line while maintaining said load engaging member in a position substantially parallel to said base members, power actuating means for said load engaging member comprising a pair of pressure cylinders mounted on said base members, pistons and piston rods slidably received in said cylinders, means on the outer ends of said rods pivotally connecting said rods to certain of said links, means for introducing fluid pressure to one portion of said cylinders to move said piston rods outwardly therefrom, said movement resulting in extension of said load engaging member, means for introducing fluid pressure to the opposite portion of said cylinders to move said piston rods inwardly, said inward movement resulting in retraction of said load engaging member, a source of fluid pressure on said pushing device and means for controlling the operation of said fluid pressure source and for controlling the operation of said power actuating means.

26. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof having means slidably received in cam slots in said upstanding members, a first pair of bell crank levers pivotally mounted on said upstanding members, the opposite ends of said bell crank levers being pivotally connected with said load engaging member by additional links, a second pair of bell crank levers pivotally mounted on said upstanding members adjacent the lower ends thereof, the opposite ends of said second pair of bell crank levers being pivotally secured to said first pair of links, link means pivotally connecting said bell crank levers at substantially the midpoints thereof, said links and bell crank levers restraining movement of said load engaging member to a substantially straight line while maintaining said load engaging member in a vertical position substantially parallel to said upstanding members, power actuating means for said load engaging member comprising a pair of pressure cylinders fixed with relation to said upstanding members, pistons and piston rods slidably received in said cylinders, the outer ends of said rods terminating in adjustably mounted shoes, said shoes engaging the upper surfaces of said second pair of bell crank levers, said shoes being connected by a rod slidably engaging cam tracks fixed with relation to said upstanding members and being slidably received in slots in said upstanding members, means for introducing fluid pressure to the upper portion of said cylinders to move said piston rods outwardly therefrom, said movement resulting in extension of said load engaging member, and means for introducing fluid pressure to the lower portion of said cylinders to retract said rods and said shoes, resilient means engaging said second pair of bell crank levers to retract said load engaging member upon retraction of said shoes, pallet gripping means disposed between said pallet engaging forks, said gripping means comprising a pair of opposed jaws slidably mounted on a portion of said carriage, a fluid pressure cylinder having a piston slidably received therein, a pair of links pivotally connected to said piston, said links being also pivotally connected to a second pair of links pivotally mounted from said cylinder and the opposite ends of said second pair of links being pivotally connected to said jaws, a third pair of links pivotally mounted from said cylinder and secured at their opposite ends to said jaws, said second and third pairs of links thus providing a floating support for said cylinder on said jaws, said second pair of links serving to transmit motion from said piston to said jaws for movement toward and away from each other, whereby upon introduction of fluid pressure to said cylinder said jaws will engage and grip a portion of said pallet thus preventing movement thereof relative to said forks, the floating mounting of said cylinder permitting engagement of said jaws with said pallet portion, regardless of any misalignment thereof, a source of fluid pressure on said unloading device and means on said truck comprising a switch for controlling the operation of said fluid pressure source and for controlling a solenoid valve whereby fluid pressure is simultaneously introduced to said pressure cylinders and said pressure cylinder associated with said gripping means whereby said pallet is restrained against movement during actuation of said load engaging member to eject a load from said pallet and whereby said switch may be operated for retracting said load engaging member and to release said gripping means.

27. For use with a commercial lift truck having vertical rails secured to the front of said truck, a carriage slidably mounted for vertical movement on said rails and pallet engaging forks secured to said carriage, an unloading device comprising upstanding members secured to said carriage, a load engaging member, a first pair of links pivotally secured adjacent the lower edge of said load engaging member and the opposite ends thereof having means slidably received in cam slots in said upstanding members, a first pair of bell crank levers pivotally mounted on said upstanding members, the opposite ends of said bell crank levers being pivotally connected with said load engaging member by additional links, a second pair of bell crank levers pivotally mounted on said upstanding members adjacent the lower ends thereof, the opposite ends of said second pair of bell crank levers being pivotally secured to said first pair of links, link means pivotally connecting said bell crank levers at substantially the midpoints thereof, said links and bell crank levers restraining movement of said load engaging member to a substantially straight line while maintaining said load engaging member in a vertical position substantially parallel to said upstanding members, power actuating means for said load engaging member comprising a pair of pressure cylinders fixed with relation to said upstanding members, pistons and piston rods slidably received in said cylinders, the outer ends of said rods terminating in adjustably mounted shoes, said shoes engaging the upper surfaces of said second pair of bell crank levers, said shoes being connected by a rod slidably engaging cam tracks fixed with relation to said upstanding members and being slidably received in slots in said upstanding members, means for introducing fluid pressure to the upper portion of said cylinders to move said piston rods outwardly therefrom, said movement resulting in extension of said load engaging members, and means for introducing fluid pressure to the lower portion of said cylinders to retract said rods and said shoes, resilient means engaging said second pair of bell crank levers to retract said load engaging member upon retraction of said shoes, a source of fluid pressure on said unloading device and means on said truck comprising a switch for controlling the operation of said fluid pressure source and for controlling a solenoid valve whereby operation of said power actuating means is controlled.

28. For use with a commercial lift truck having pallet engaging forks, an unloading device comprising members secured to said forks, a load engaging member, a first pair of links secured to said load engaging member and the opposite ends thereof having means slidably received in slots in said members, a first pair of bell crank levers pivotally mounted on said members, the opposite ends of said bell crank levers being pivotally connected with said load engaging member by additional links, a second pair of bell crank levers pivotally mounted on said members, the opposite ends of said second pair of bell crank levers being pivotally secured to said first pair of links, link means pivotally connecting said bell crank levers at substantially the midpoints thereof, said links and bell crank levers restraining movement of said load engaging member to a substantially straight line while maintaining said load engaging member in a vertical position substantially parallel to said members, power actuating means for said load engaging member comprising a pair of pressure cylinders fixed with relation to said members, pistons and piston rods slidably received in said cylinders, the outer ends of said rods terminating in adjustably mounted shoes, said shoes engaging the upper surfaces of said second pair of bell crank levers, said shoes being connected by a rod slidably engaging cam tracks, means for introducing fluid pressure to the upper portion of said cylinders to move said piston rods outwardly therefrom, said movement resulting in extension of said load engaging member, and means for introducing fluid pressure to the lower portion of said cylinders to retract said rods and said shoes, resilient means engaging said second pair of bell crank levers to retract said load engaging member upon retraction of said shoes, a fluid pressure source on said unloading device and means on said truck for controlling the operation of said fluid pressure source and for controlling the operation of said power actuating means.

29. For use with a commercial lift truck having pallet engaging forks, an unloading device comprising members secured to said forks, a load engaging member, links pivotally and slidably connecting said load engaging members and said members, a plurality of bell crank levers pivotally connected to said members and being connected to said load engaging member by additional links, said links and bell crank levers restraining movement of said load engaging member to a substantially straight line while maintaining said load engaging member in a vertical position substantially parallel to said members, power actuating means for said load engaging member comprising pressure cylinders fixed with relation to said members, pistons and piston rods slidably received in said cylinders, the outer ends of said rods terminating in shoes, said shoes engaging the upper surfaces of certain of said bell crank levers, said shoes being guided for movement by a rod engaging cam tracks, means for introducing fluid pressure to one portion of said cylinders to move said piston rods outwardly therefrom, said movement resulting in extension of said load engaging member and means for introducing fluid pressure to the opposite portion of said cylinders to retract said rods and said shoes, means to retract said load engaging member upon retraction of said shoes, a fluid pressure source and means for controlling the operation of said fluid pressure source and for controlling the operation of said fluid pressure source and for controlling the operation of said power actuating means.

30. For use with a commercial lift truck having pallet engaging forks, an unloading device comprising members secured to said forks, a load engaging member, a first pair of links secured to said load engaging member and the opposite ends thereof having means slidably received in slots in said members, a first pair of bell crank levers pivotally mounted on said members, the opposite ends of said bell crank levers being pivotally connected with said load engaging member by additional links, a second pair of bell crank levers pivotally mounted on said members, the opposite ends of said second pair of bell crank levers being pivotally secured to said first pair of links, link means pivotally connecting said bell crank levers at substantially the midpoints thereof, said links and bell crank levers restraining movement of said load engaging member to a substantially straight line while maintaining said load engaging member in a vertical position substantially parallel to said members, power actuating means for said load engaging member engaging certain of said bell crank levers whereby outward movement of said power actuating means will result in extension of said load engaging member, means to retract said load engaging member upon inward movement of said power actuating means, and means for controlling the operation of said power actuating means.

31. A pushing device comprising base members having slots, a load engaging member, a first pair of links pivotally secured to said load engaging member and the opposite ends thereof having means slidably received in said slots, a pair of bell crank levers pivotally mounted on said base members, the opposite ends of said bell crank levers being pivotally connected with said load engaging member by additional links, a second pair of bell crank levers pivotally mounted on said base members, the opposite ends of said second pair of bell crank levers being pivotally secured to said first pair of links, said links and bell crank levers restraining movement of said load engaging member to a substantially straight line while maintaining said load engaging member in a position substantially parallel to said base members, power actuating means for said load engaging member, and means for controlling operation of said power actuating means whereby said load engaging member is extended or retracted.

JULIAN B. THOMAS.

References Cited in the file of this patent

UNITED STATES PATENTS

| Number | Name | Date |
|---|---|---|
| 1,859,830 | Kummel | May 24, 1932 |
| 2,047,347 | Wheelock | July 14, 1936 |
| 2,176,636 | Meacham | Oct. 17, 1939 |
| 2,256,454 | Bomar | Sept. 16, 1941 |
| 2,371,661 | Wilms | Mar. 20, 1945 |
| 2,402,579 | Ross | June 25, 1946 |
| 2,418,661 | Palm | Apr. 8, 1947 |
| 2,509,023 | Vogel et al. | May 23, 1950 |

FOREIGN PATENTS

| Number | Country | Date |
|---|---|---|
| 474,968 | Germany | Feb. 23, 1927 |